Figure 1:
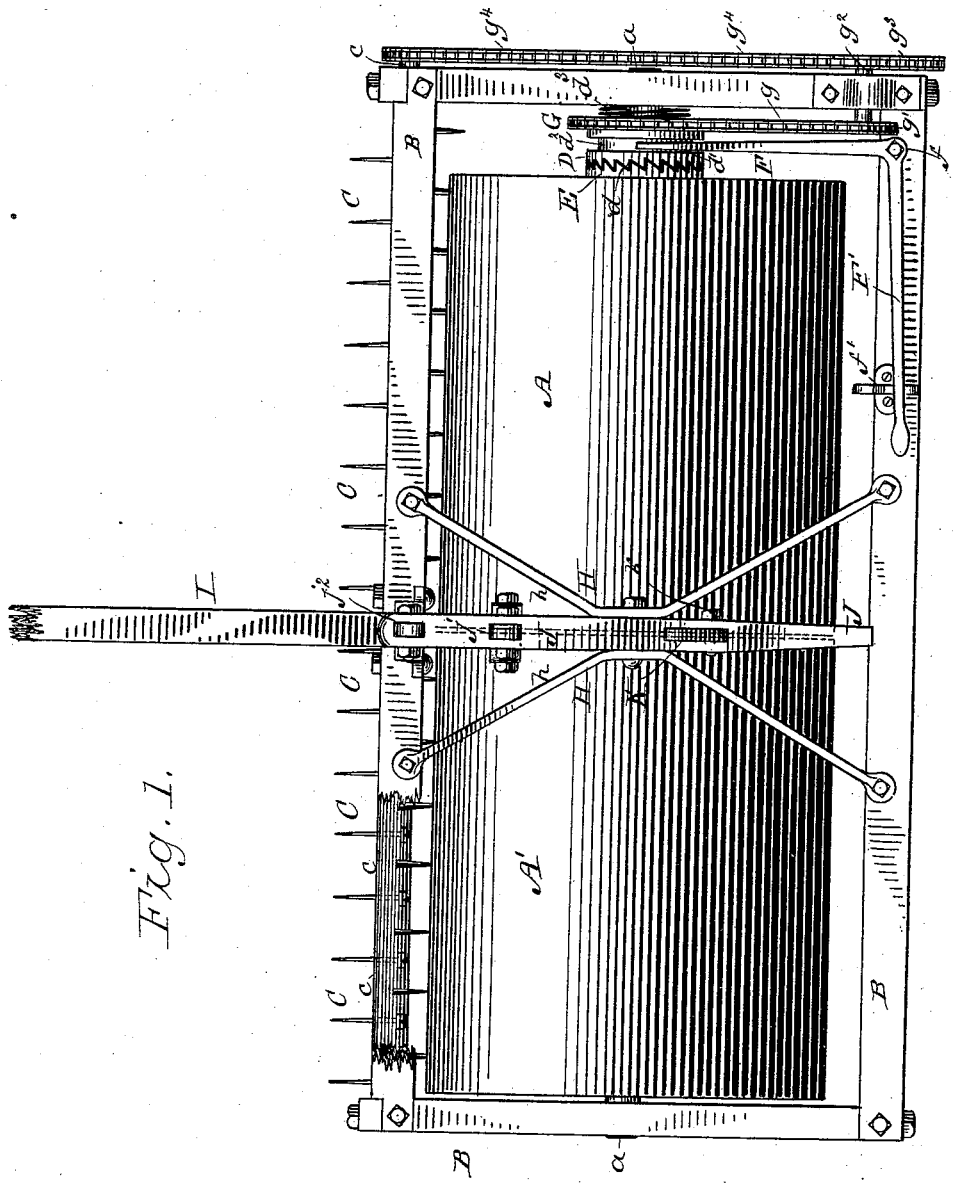

(No Model.)
2 Sheets—Sheet 1.

J. MILLS.
COMBINED ROLLER AND CULTIVATOR.

No. 352,928. Patented Nov. 23, 1886.

WITNESSES
INVENTOR
James Mills
By his Attorneys (No Model.) 2 Sheets—Sheet 2.
J. MILLS.
COMBINED ROLLER AND CULTIVATOR.
No. 352,928. Patented Nov. 23, 1886.
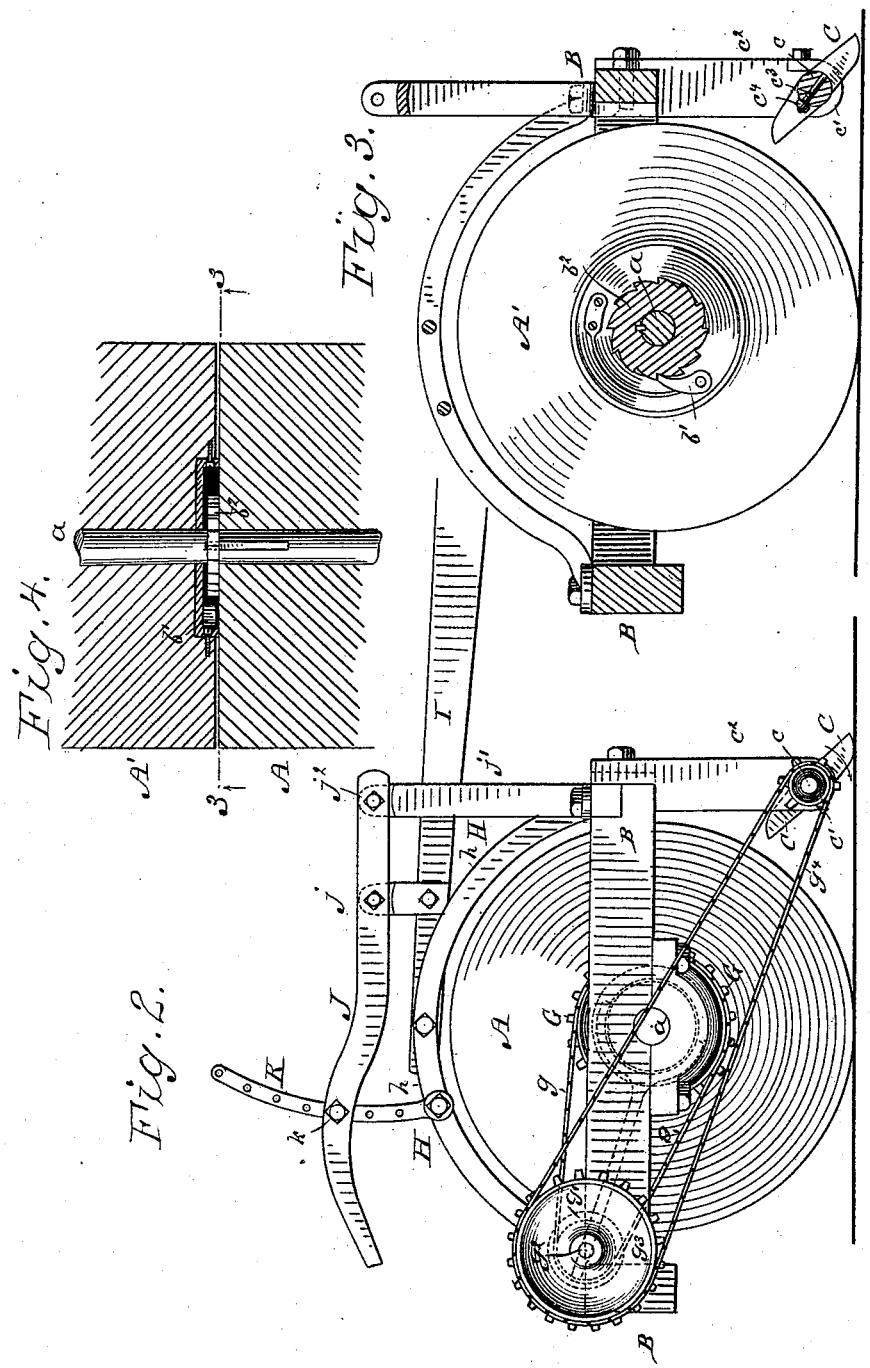

UNITED STATES PATENT OFFICE.

JAMES MILLS, OF KEYESPORT, ILLINOIS.

COMBINED ROLLER AND CULTIVATOR.

SPECIFICATION forming part of Letters Patent No. 352,923, dated November 23, 1886.

Application filed May 5, 1886. Serial No. 201,174. (No model.)

*To all whom it may concern:*

Be it known that I, JAMES MILLS, of Keyesport, in the county of Clinton and State of Illinois, have invented certain new and useful Improvements in Combined Rollers and Cultivators, of which the following is a specification.

In my improved machine the cultivators precede the rollers and are mounted on a shaft driven from the roller-shaft. The cultivators are vertically adjustable, so as to vary the depth of cut or to withdraw entirely from the soil. The driving-gear between the cultivator-shaft and the roller-shaft is arranged to turn the cultivator-shaft only when the machine is advanced, and is readily disconnected, so that the machine may be used simply as a land-roller. I preferably employ two rollers, one being fast on the shaft and the other loose, the two rollers being connected by devices that permit the rollers to travel together when the machine advances, but permit of an independent movement when the machine is backed or turned.

In the accompanying drawings, Figure 1 is a plan of my improved machine; Fig. 2, a side view; Figs. 3 and 4, detail views of the devices for connecting the rollers together.

The rollers A A' are mounted on a common shaft, $a$, and are journaled in bearings $b$ in the main frame B. The roller A is fast on the shaft $a$. The roller A' is loose on said shaft. On the inner end of the roller A', near its axis, is a spring-pawl, $b'$, that engages with a ratchet-wheel, $b^2$, on the roller A. When the machine is advanced, the two rollers turn together. When the machine is backed or is turned, the pawl rides over the ratchet-wheel, thus disconnecting the two rollers and allowing them to have an independent and easier movement. When the machine is turned, the roller A' moves in a contrary direction to the roller A, thereby lessening friction and facilitating materially the movement.

The cultivators C are mounted on a shaft, $c$, journaled in bearings $c'$ in hangers $c^2$. I preferably employ cultivator-teeth such as illustrated, and arrange them in two rows on opposite sides of the shaft $c$. Each tooth is independently connected to the shaft by means of its shank $c^3$ and a nut, $c^4$, that fits on the screw-threaded end of the shank $c^3$, that projects through the shaft.

On the roller-shaft $a$ is loosely mounted a pulley, D, having on its inner edge an annular series of teeth, $d$, that normally engage with a toothed wheel, E, rigidly secured to the roller A. On the outer side of the pulley D is formed a drum, $d'$, having an annular groove, $d^2$, in which fits the forked end of the shifting-lever F.

Between the drum $d'$ and the main frame B is interposed a spring, $d^3$, that normally causes the teeth on the pulley D to engage with the toothed wheel E. The shifting-lever F is pivoted to the rear of the main frame at $f$. The lever F has a right-angled extension, F', the outer end of which has a locking device, $f'$, for holding the lever when the pulley D is disengaged from the toothed wheel E. The pulley D is connected with a pulley, G, on the cultivator-shaft $c$ by means of belt $g$, pulley $g'$, shaft $g^2$, pulley $g^3$, and belt $g^4$. When the machine is advanced, (the shifting-lever being unlocked,) the pulley D will engage with the roller A and the cultivator-shaft will be rotated. If the machine is backed, the pulley D will slide on the shaft $a$ against the force of the spring, thus throwing the pulley out of gear, and the cultivator-shaft will not rotate.

A bridge, H, formed of two curved bars, $h$, extends over the rollers, and is secured to the front and rear beams of the main frame. Between the curved bars $h$ is bolted the tongue I. The bars $h$ preferably diverge from the top downwardly, so as to effectively brace the bridge. A lever, J, is pivoted to the bridge, or to the tongue, as shown at $j$, and its outer end is connected to the front beam of the main frame by means of an arch-bar, $j'$, through which the tongue extends. The upper end of the arch-bar is pivoted to the end of the lever J, as indicated at $j^2$. The lever may be held in any desired position by means of the perforated curved bar K and pin $k$, or any other suitable device.

I claim as my invention—

1. The combination, substantially as set forth, of the main frame, the roller-shaft, the roller fast on the shaft, a second roller loose on the shaft, and means for automatically locking the two rollers together when the machine is advanced.

2. The combination, substantially as set forth, of the main frame, the roller-shaft, the roller fast on the shaft, a second roller loose on the shaft, the ratchet-wheel on one of the rollers, and the pawl on the other roller, that engages with the ratchet-wheel when the machine is advanced, whereby both rollers are caused to turn together.

3. The combination, substantially as set forth, of the main frame, the roller or rollers, the cultivator-shaft, and gearing between the roller or rollers and the cultivator-shaft, that operates to revolve the cultivator-shaft when the machine is advanced, but that is inoperative when the machine is backed.

4. The combination, substantially as set forth, of the main frame, the roller or rollers, the cultivator-shaft, gearing between the roller or rollers and the cultivator-shaft, that operates to revolve the cultivator-shaft when the machine is advanced, but that is inoperative when the machine is backed, and the lever for shifting or unlocking the gearing.

In testimony whereof I have hereunto subscribed my name.

JAMES MILLS.

Witnesses:
JACOB KERNER,
JOHN PALMER.